(12) United States Patent (10) Patent No.: US 11,869,118 B2
Chennagiri et al. (45) Date of Patent: Jan. 9, 2024

(54) GENERATING A SYNTHETIC GROUND-TRUTH IMAGE USING A DEAD LEAVES MODEL

(71) Applicant: Samsung Electronics Co., Ltd., Suwon-si (KR)

(72) Inventors: Pavan Chennagiri, Austin, TX (US); John Seokjun Lee, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/588,024

(22) Filed: Jan. 28, 2022

(65) Prior Publication Data

US 2023/0091909 A1    Mar. 23, 2023

Related U.S. Application Data

(60) Provisional application No. 63/247,117, filed on Sep. 22, 2021.

(51) Int. Cl.
| | | |
|---|---|---|
| *G06T 11/00* | (2006.01) | |
| *G06T 19/20* | (2011.01) | |
| *G06T 7/90* | (2017.01) | |
| *G06T 5/00* | (2006.01) | |

(Continued)

(52) U.S. Cl.
CPC ............ *G06T 11/001* (2013.01); *G06N 20/00* (2019.01); *G06T 5/002* (2013.01); *G06T 7/90* (2017.01); *G06T 17/00* (2013.01); *G06T 19/20* (2013.01); *G06T 2207/10012* (2013.01);

(Continued)

(58) Field of Classification Search
CPC ......... G06T 11/001; G06T 5/002; G06T 7/90; G06T 17/00; G06T 19/20; G06T 2207/10012; G06T 2207/10024; G06T 2207/20081; G06T 2219/2012; G06N 20/00

See application file for complete search history.

(56) References Cited

U.S. PATENT DOCUMENTS

| | | | |
|---|---|---|---|
| 10,867,073 B1 * | 12/2020 | Yang | ............... G06F 21/604 |
| 11,120,536 B2 | 9/2021 | Park et al. | |
| 11,475,158 B1 * | 10/2022 | Zhang | ............... G06N 3/096 |

(Continued)

FOREIGN PATENT DOCUMENTS

| | | |
|---|---|---|
| WO | 2014095560 A1 | 6/2014 |
| WO | 2015125146 A1 | 8/2015 |

OTHER PUBLICATIONS

Zhu et al, "Computer Vision Statistical Models for Marr's Paradigm", 20200818, Springer International Publishing (Year: 2020).*

(Continued)

*Primary Examiner* — YuJang Tswei

(57) ABSTRACT

An apparatus includes at least one memory configured to store an AI network and at least one processor. The at least one processor is configured to generate a dead leaves model. The at least one processor is also configured to capture a ground truth frame from the dead leaves. The at least one processor is further configured to apply a mathematical noise model to the ground truth frame to produce a noisy frame. In addition, the at least one processor is configured to train the AI network using the ground truth frame and the noisy frame.

20 Claims, 14 Drawing Sheets

(51) Int. Cl.
  *G06N 20/00* (2019.01)
  *G06T 17/00* (2006.01)
(52) U.S. Cl.
  CPC .............. *G06T 2207/10024* (2013.01); *G06T 2207/20081* (2013.01); *G06T 2219/2012* (2013.01)

(56) References Cited

U.S. PATENT DOCUMENTS

| | | | | |
|---|---|---|---|---|
| 2012/0105728 | A1* | 5/2012 | Liu | H04N 5/213 348/607 |
| 2014/0126808 | A1* | 5/2014 | Geisler | G06V 10/457 382/275 |
| 2015/0300963 | A1* | 10/2015 | Haidekker | G06T 11/008 382/131 |
| 2018/0014003 | A1 | 1/2018 | Grover et al. | |
| 2018/0108137 | A1* | 4/2018 | Price | G06T 7/11 |
| 2020/0242739 | A1* | 7/2020 | Laine | G06N 3/045 |
| 2021/0011161 | A1* | 1/2021 | Chen | G06N 3/045 |
| 2021/0012463 | A1* | 1/2021 | Ramani | G06T 11/006 |
| 2021/0272240 | A1* | 9/2021 | Litwiller | G06T 5/002 |
| 2022/0284232 | A1* | 9/2022 | Yin | G06F 18/2413 |

OTHER PUBLICATIONS

Achddou et al., "Synthetic images as a regularity prior for image restoration neural networks", 202105, Hal (Year: 2021).*
Cao et al, Dead leaves model for measuring texture quality on a digital camera—2010—SPIE (Year: 2010).*
Sajjadi et al, EnhanceNet—Single Image Super-Resolution Through Automated Texture Synthesis—20170730—arXiv (Year: 2017).*
Li et al, Image_Colorization_Based_on_Texture_by_Using_of_CNN—2019—IEEE (Year: 2019).*

\* cited by examiner

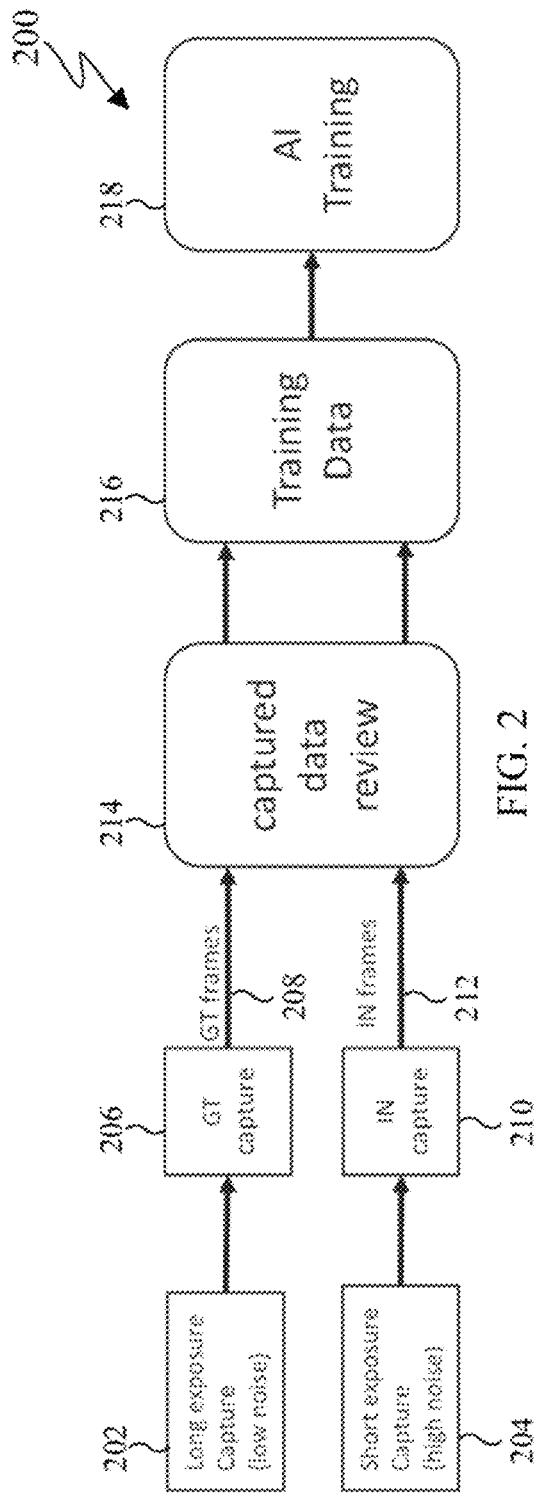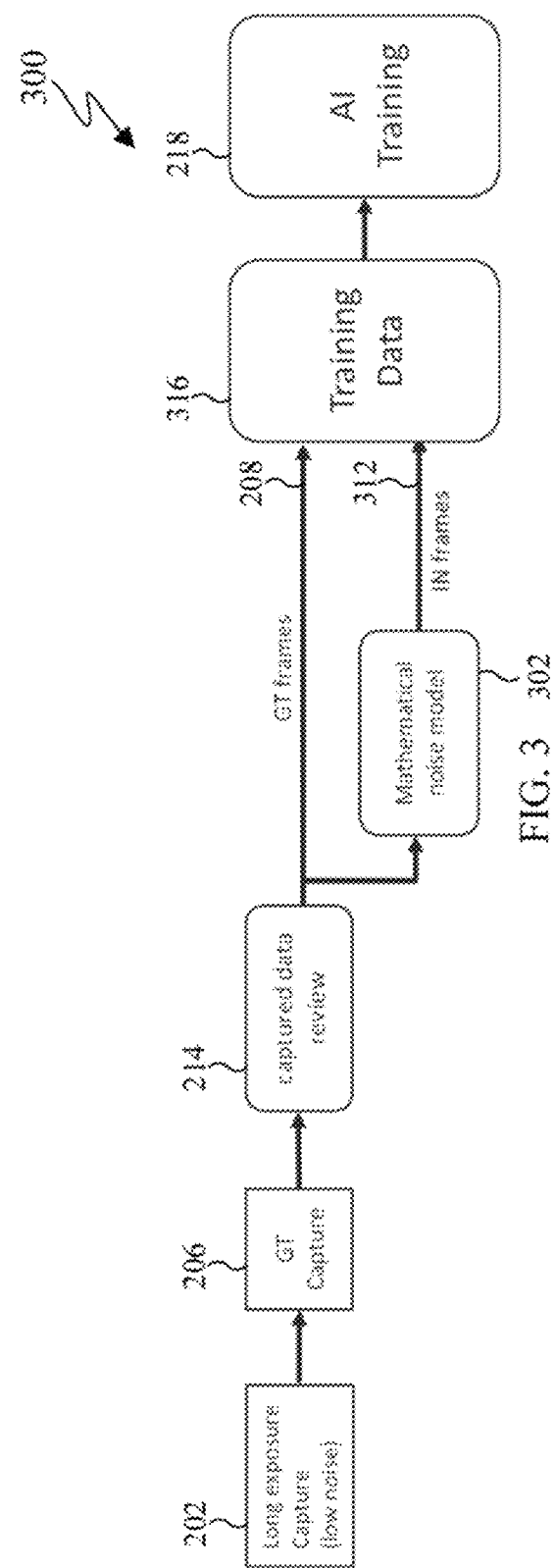

FIG. 9A
FIG. 9B
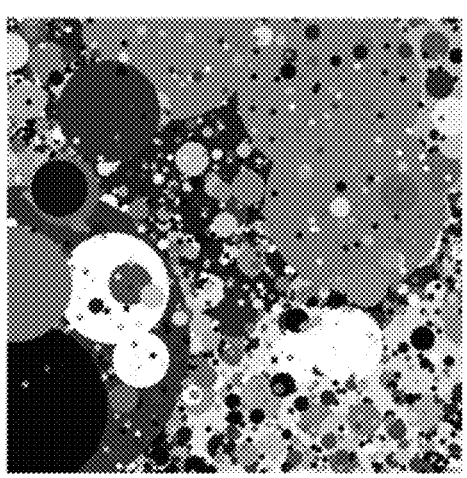
FIG. 9C
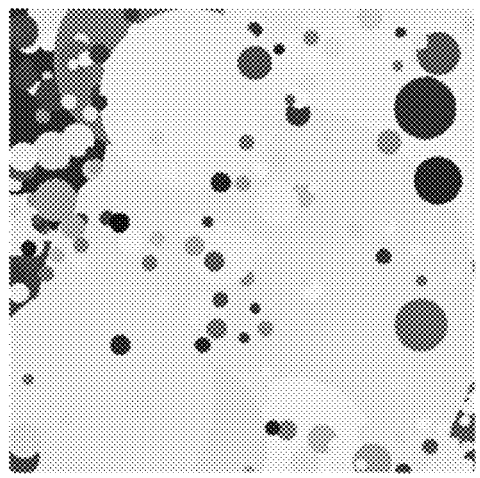
FIG. 9D

GENERATING A SYNTHETIC GROUND-TRUTH IMAGE USING A DEAD LEAVES MODEL

CROSS-REFERENCE TO RELATED APPLICATION AND PRIORITY CLAIM

This application claims priority under 35 U.S.C. § 119(e) to U.S. Provisional Patent Application No. 63/247,117 filed on Sep. 22, 2021, which is hereby incorporated by reference in its entirety.

TECHNICAL FIELD

This disclosure relates generally to image processing device devices and processes. More specifically, this disclosure relates to image processing devices and processes for generating a synthetic ground-truth image using a dead leaves model.

BACKGROUND

Artificial intelligence (AI) technology has been applied recently in greater focus to many camera applications such as denoising, motion deblur, high dynamic range (HDR), segmentation, disparity estimate, etc. in order to push the boundary of non-AI based image pipelines. However, creating realistic training data is challenging for some applications because ground-truth is not available or not easy to generate. The examples of application affected by not having ground-truth available can include disparity estimation, optical flow estimation, multi-camera aligned capture, etc. Because of such challenges, training data generation for AI camera functions is a very important task to improve an AI camera performance.

SUMMARY

This disclosure provides for generating a synthetic ground-truth using a dead leaves model.

In a first embodiment, an apparatus includes at least one memory configured to store an AI network and at least one processor. The at least one processor is configured to generate a dead leaves model. The at least one processor is also configured to capture a ground truth frame from the dead leaves. The at least one processor is further configured to apply a mathematical noise model to the ground truth frame to produce a noisy frame. In addition, the at least one processor is configured to train the AI network using the ground truth frame and the noisy frame.

In a second embodiment, a method includes generating a dead leaves model. The method also includes capturing a ground truth frame from the dead leaves model. The method further includes applying a mathematical noise model to the ground truth frame to produce a noisy frame. In addition, the method includes training an AI network using the ground truth frame and the noisy frame.

In a third embodiment, a non-transitory machine readable medium stores instructions that when executed cause a processor to generate a dead leaves model. The instructions that when execute also cause a processor to capture a ground truth frame from the dead leaves. The instructions that when execute further cause a processor to apply a mathematical noise model to the ground truth frame to produce a noisy frame. In addition, the instructions that when execute cause a processor to train the AI network using the ground truth frame and the noisy frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to"

another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates an exemplary AI training data generation in accordance with this disclosure;

FIG. 3 illustrates an exemplary AI training data generation in accordance with this disclosure;

FIGS. 9A through 9D illustrate exemplary color sampling in accordance with this disclosure;

DETAILED DESCRIPTION

FIGS. 1 through 15, described below, and the various embodiments of this disclosure are described with reference to the accompanying drawings. However, it should be appreciated that this disclosure is not limited to these embodiments and all changes and/or equivalents or replacements thereto also belong to the scope of this disclosure.

Before a picture is displayed on an electronic device, the electronic device performs many functions to process image data. AI camera is a newly applied feature to the camera on the electronic device. One of the challenges of implementing an AI network to replace a non-AI-algorithm is how to prepare, collect, and generate training data. For example, an AI based noise reduction algorithm can be implemented. In order to train an AI based noise reduction algorithm, two input images are required. A first image is a noise image and a second image is a ground truth noise cleaned image. The noise image and the ground truth image are fed to the AI machine, which runs the details required to generate the AI network to remove noise in images.

New flagship and meteor phones are released to the public almost every six months. The new flagship phone or meteor phone is normally released with different sensors than the predecessors. New hardware means that engineers must collect data on the new hardware for retraining AI networks, which is a significant undertaking requiring many resources. A second challenge is that the manually collected data does not predict every possibility. For example, training an AI network for daytime image capturing may not prepare the AI network for cloudy days.

Manual data captured using smartphone devices can be used for generating AI training data. The challenges and drawbacks of a manual data capture include: (i) a large amount requirement for human resources and costs; (ii) manual capture data-sets need to be reviewed by data engineers and are often deleted due of a low quality capture or an incorrect/inaccurate capture; and (iii) if sensor hardware is changed, training data is required to be re-captured and reviewed again. To address those challenges, a fully synthetic data generation and ground truth generation pipeline using a dead leaves model was developed. Using the proposed approach, the synthetic generation for AI denoising and AI disparity estimate network can be validated.

Figure 1:
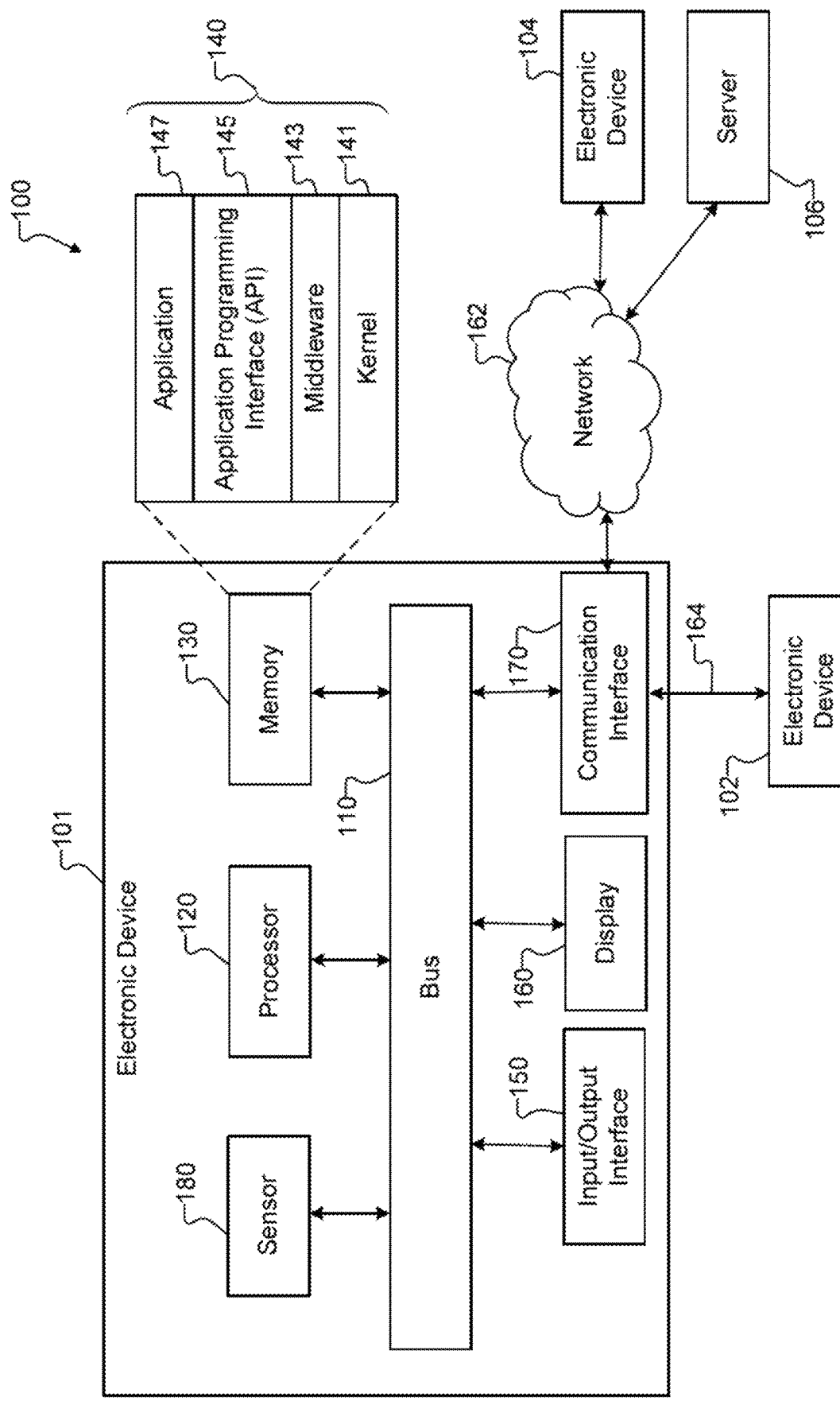
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor(s) 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain and process synthetic ground truth images using a dead leave model for training an AI network as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process synthetic ground truth images using a dead leave model for training an AI network. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensor(s) 180 that can meter a physical quantity or detect an activation state of the electronic device 101 and convert metered or detected information into an electrical signal. For example, the sensor(s) 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may obtain and process synthetic ground truth images using a dead leave model for training an AI network as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIG. 2 illustrates an exemplary AI training data generation process 200 in accordance with this disclosure. The embodiment of the AI training data generation process 200 shown in FIG. 2 is for illustration only. Other embodiments could be used without departing from the scope of the present disclosure.

As shown in FIG. 2, AI training data generation process 200 can capture or generate AI training data for solving an AI denoising problem. Low noise images 202 and high noise images 204 are respectively captured from long exposure capture events and short exposure capture events. Long exposure events allow for collecting more light but also introduces more noise. Short exposure events collect less light but can introduce significantly less noise.

A ground truth capture 206 produces ground truth frames 208 from the low noise images 202. An input capture 210 produces input frames 212. These data sets are useful for AI training 218 resulting from capturing real noise characteristics but require careful data capture. Although taken at different ISO levels, the long and short exposure captures should be aligned to capture the scene. Even though many ISO levels can be captured, the AI training data generation process 200 can interpolate the data for any gaps between ISO levels. The ground truth capture 206 can be used for modeling of camera sensor noise.

A data review 214 removes any data frames that are determined to be non-useful for AI training 218. The ground truth frames 208 and the input frames 212 can be further processed as training data 216. The training data 216 is provided to the AI training 218 to predict or detect a noise in images.

Although FIG. 2 illustrate an exemplary AI training data generation process 200, various changes may be made to FIG. 2. For example, the sizes, shapes, and dimensions of the AI training data generation process 200 and its individual components can vary as needed or desired. Also, the number and placement of various components of the AI training data generation process 200 can vary as needed or desired. In addition, the AI training data generation process 200 may be used in any other suitable imaging process and is not limited to the specific processes described above.

FIG. 3 illustrates an exemplary AI training data generation process 300 in accordance with this disclosure. The embodiment of the AI training data generation process 300 shown in FIG. 3 is for illustration only. Other embodiments could be used without departing from the scope of the present disclosure.

As shown in FIG. 3, AI training data generation process 300 can capture or generate AI training data to solve an AI denoising problem. Low noise images 202 are captured from long exposure capture events. Long exposure allows for collecting more light but also introduces more noise.

A ground truth (GT) capture 206 produces ground truth frames 208 from the low noise images 202. These data sets are useful for AI training 218 due to a capturing of real noise characteristics but require careful data capture. Although taken at different ISO levels, the long and short exposure captures should be aligned to capture the scene. Even though many ISO levels can be captured with this method, the AI training data generation process 300 can interpolate the data for any gaps between ISO levels.

A data review 214 can remove any data frames that are determined to be non-useful for AI training 218. Once the ground truth capture 206 is produced and reviewed, a synthetic short exposure frame or synthetic input frame 312 can be mimicked using a mathematical noise model 302 on the ground truth frame 208. The ground truth frames 208 and the synthetic input frames 312 can be further processed as hybrid training data 316. The hybrid training data 316 is provided to the AI training 218 for determining noise in images.

Although FIG. 3 illustrate an exemplary AI training data generation, various changes may be made to FIG. 3. For example, the sizes, shapes, and dimensions of the AI training data generation process 300 and its individual components can vary as needed or desired. Also, the number and placement of various components of the AI training data generation process 300 can vary as needed or desired. In addition, the AI training data generation process 300 may be used in any other suitable imaging process and is not limited to the specific processes described above.

Figure 4:
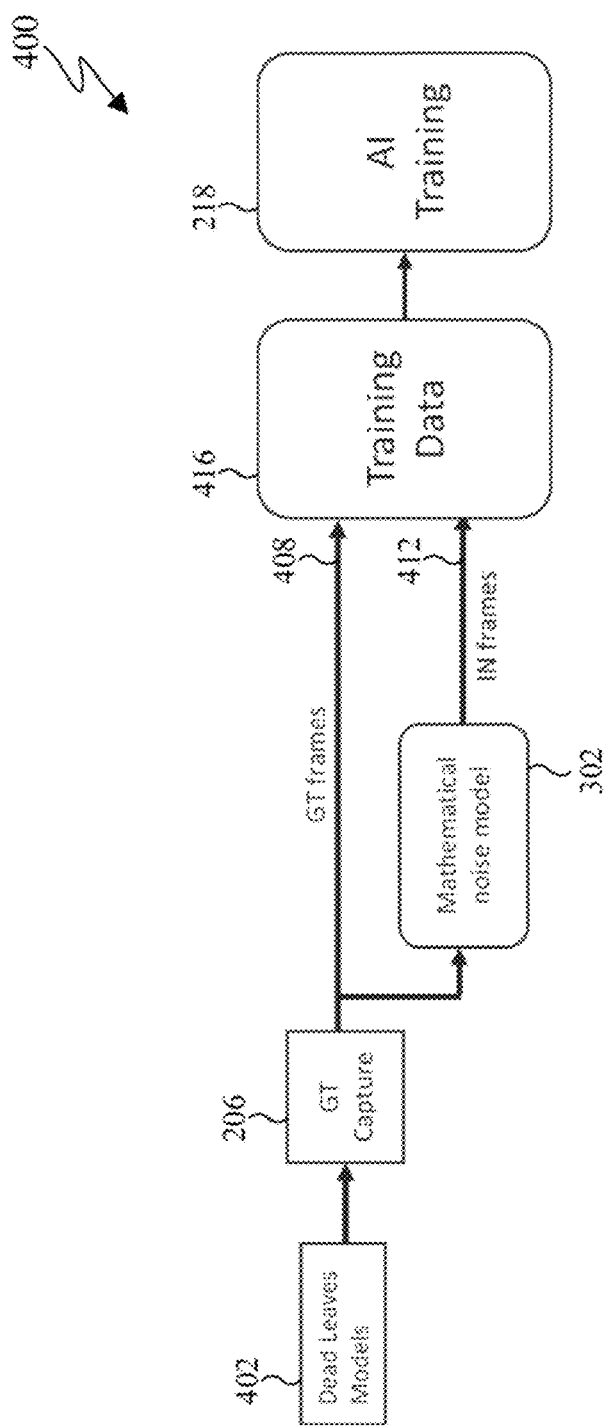
FIG. 4 illustrates an exemplary AI synthetic training data generation in accordance with this disclosure.

FIG. 4 illustrates an exemplary AI synthetic training data generation process 400 in accordance with this disclosure. The embodiment of the AI synthetic training data generation process 400 shown in FIG. 4 is for illustration only. Other embodiments can be used without departing from the scope of the present disclosure.

As shown in FIG. 4, the AI synthetic training data generation process 400 can generate AI synthetic training data for solving an AI denoising problem. Unlike AI training data generation process 200 and AI training data generation process 300, the synthetic training data 416 does not include any frames that are real or captured by a sensor. The information for the frames of the synthetic training data is one or more synthetic ground truth frames 408 generated by a dead leaves model(s) 402 or a synthetic input frame 412 subsequently processed with a mathematical noise.

A ground truth capture 206 can produce synthetic ground truth frame(s) 408 from the dead leaves model 402. Once the synthetic ground truth frame 408 is produced, the synthetic short exposure frame or synthetic input frame 412 can be mimicked using a mathematical noise model 402 applied to the synthetic ground truth frame(s) 408. The synthetic ground truth frame(s) 408 and the synthetic input frame(s) 412 can be further processed as synthetic training data 416. The training data 216 is provided to the AI training 218 for determining and removing noise in captured images.

Although FIG. 4 illustrate an exemplary AI synthetic training data generation process 400, various changes may be made to FIG. 4. For example, the AI synthetic training data generation process 400 and its individual components can vary as needed or desired. Also, the number and placement of various components of the AI synthetic training data generation process 400 can vary as needed or desired. In addition, the AI synthetic training data generation process 400 may be used in any other suitable imaging process and is not limited to the specific processes described above.

Figure 5A:
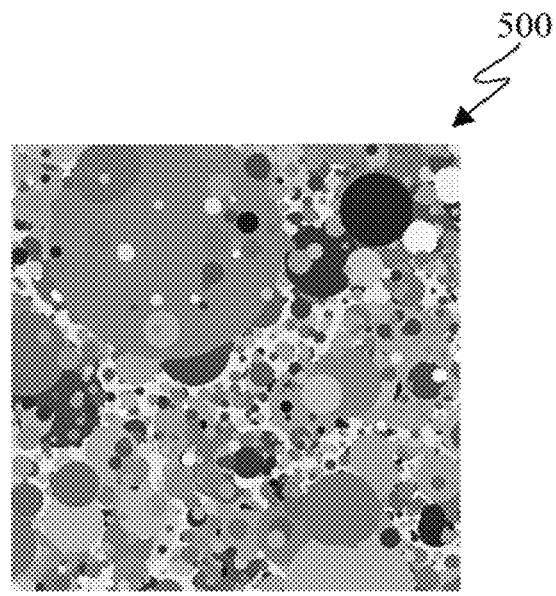
FIGS. 5A and 5B illustrate dead leaves model in accordance with this disclosure.
Figure 5B:
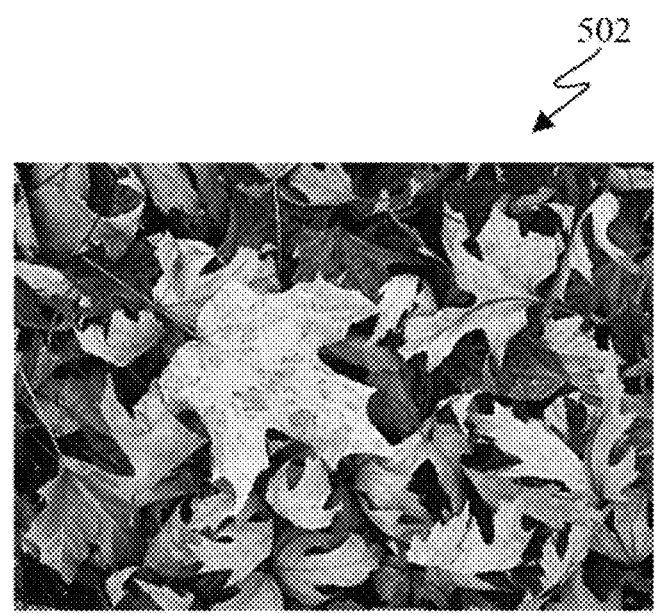

FIGS. 5A and 5B illustrate a dead leaves model 500 in accordance with this disclosure. More particularly, FIG. 5A illustrates dead leaves model 500 and FIG. 5B illustrates a natural image 502. The embodiments of the dead leaves model 500 and the natural image 502 shown in FIGS. 5A and 5B are for illustration only. Other embodiments could be used without departing from the scope of the present disclosure.

As shown in FIGS. 5A and 5B, a dead leaves model 500 can be synthetically generated from the natural image 502 or represent the natural image 502. The dead leaves model 500 is defined as a sequential superimposition of random closed sets. The dead leaves model 500 can provide a natural tool to study an occlusion phenomenon as an essential ingredient in a formation of visual images. In certain embodiments, the dead leaves model 500 can present images as sequential superposition of shapes, such as a disk (circle), square, or any other suitable shape for presenting the dead leave model 500. As a non-limiting example, the natural image 502 can be a pile of leaves that have fallen on each other and the dead leaves model 500 can be a series of overlapping circles representing details of the natural image 502.

Properties of the dead leaves model 500 can include natural image statistics, scale invariance, downscaling/upscaling, and pattern statistics. The natural image statistics can include replicated natural image statistics using a dead leaves template. A comparison of the dead leaves template is further illustrated herein with respect to FIGS. 6A 6B, 7A and 7B. The downscaling/upscaling can change a pattern but would not change the statistics. The pattern statistics can be invariant to magnification, cropping, and pixel dimensions.

Although FIGS. 5A and 5B illustrate a dead leaves model 500, various changes may be made to FIGS. 5A and 5B. For example, the sizes, shapes, and dimensions of the dead leaves model 500 and the natural image 502 and their individual components can vary as needed or desired. Also, the number and placement of various components of the dead leaves model 500 and the natural image 502 can vary as needed or desired. In addition, the dead leaves model 500 and the natural image 502 may be used in any other suitable imaging process and is not limited to the specific processes described above.

Figure 6A:
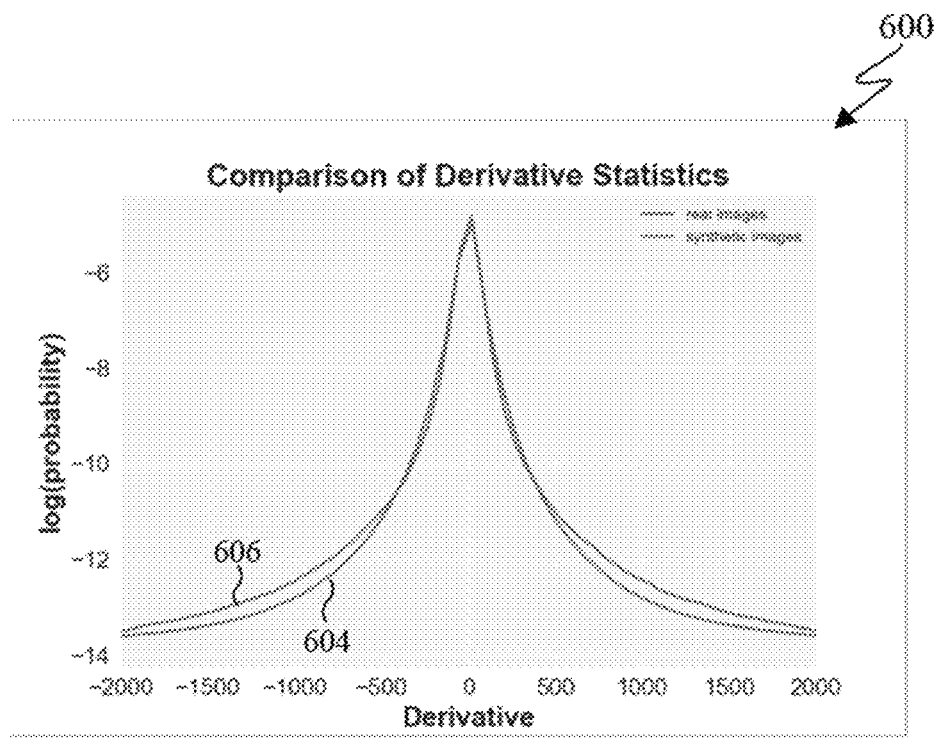
FIGS. 6A and 6B illustrate exemplary statistical comparisons in accordance with this disclosure.
Figure 6B:
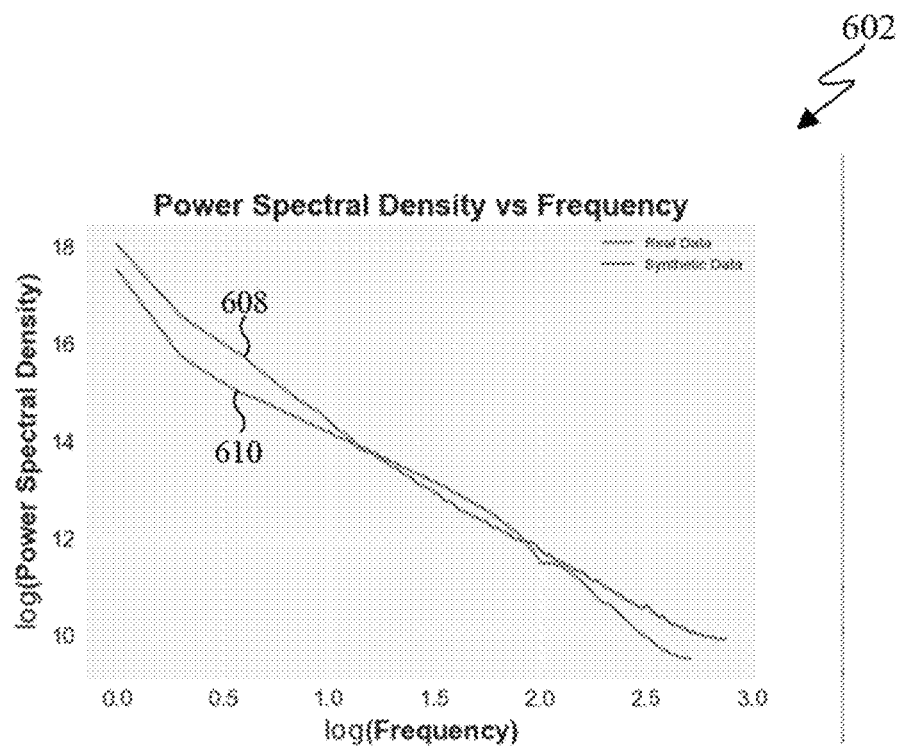

FIGS. 6A and 6B illustrate exemplary statistical comparisons in accordance with this disclosure. More particularly, FIG. 6A illustrates a derivative statistics comparison 600 and FIG. 6B illustrates a power spectral density comparison 602. The embodiments of the derivative statistics comparison 600 and the power spectral density comparison 602 illustrated in FIGS. 6A and 6B are for illustration only. Other embodiments could be used without departing from the scope of the present disclosure.

As shown in FIG. 6A, the derivative statistic comparison 600 compares a log probability and derivative for a real image 604 and a synthetic image 606. The derivative statistic comparison 600 shows that the statistic for the synthetic image 606 are similar to the statistics for the real image 604.

As shown in FIG. 6B, the power spectral density comparison 602 compares a log power spectral density and a log frequency for a real data 608 and a synthetic data 610. The power spectral density comparison 602 shows that the statistic for the synthetic data 610 are similar to the statistics for the real image 604. The synthetic data 610 has approximately a same slope as the real data 608.

Although FIGS. 6A and 6B illustrate statistical comparison, various changes may be made to FIGS. 6A and 6B. For example, the sizes, shapes, and dimensions of the derivative statistics comparison 600 and the power spectral density comparison 602 and their individual components can vary as needed or desired. Also, the number and placement of various components of the derivative statistics comparison 600 and the power spectral density comparison 602 can vary as needed or desired. In addition, the derivative statistics comparison 600 and the power spectral density comparison 602 may be used in any other suitable imaging process and is not limited to the specific processes described above.

Figure 7A:
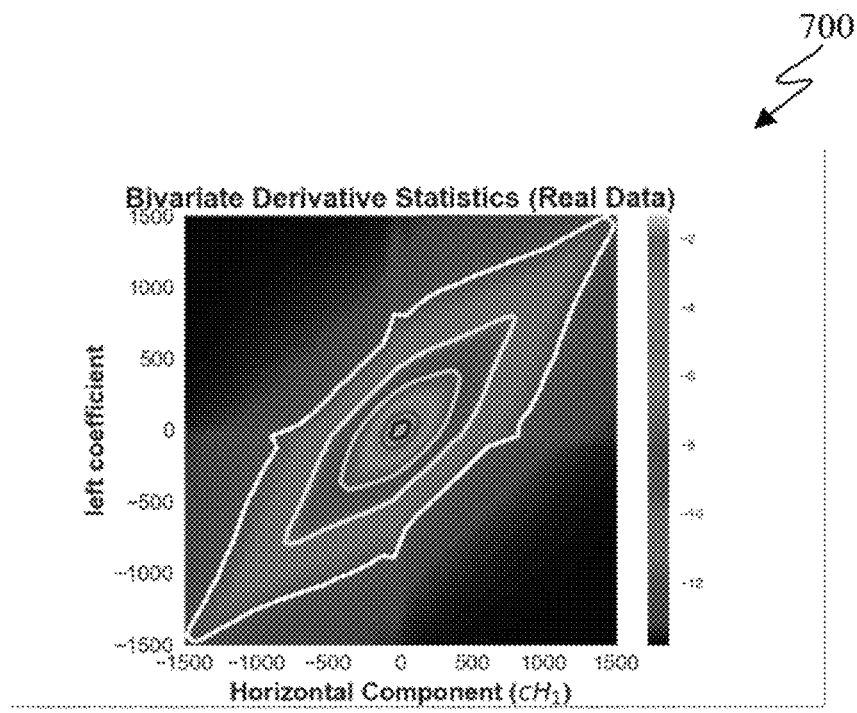
FIGS. 7A and 7B illustrate bivariate derivative statistics in accordance with this disclosure.
Figure 7B:
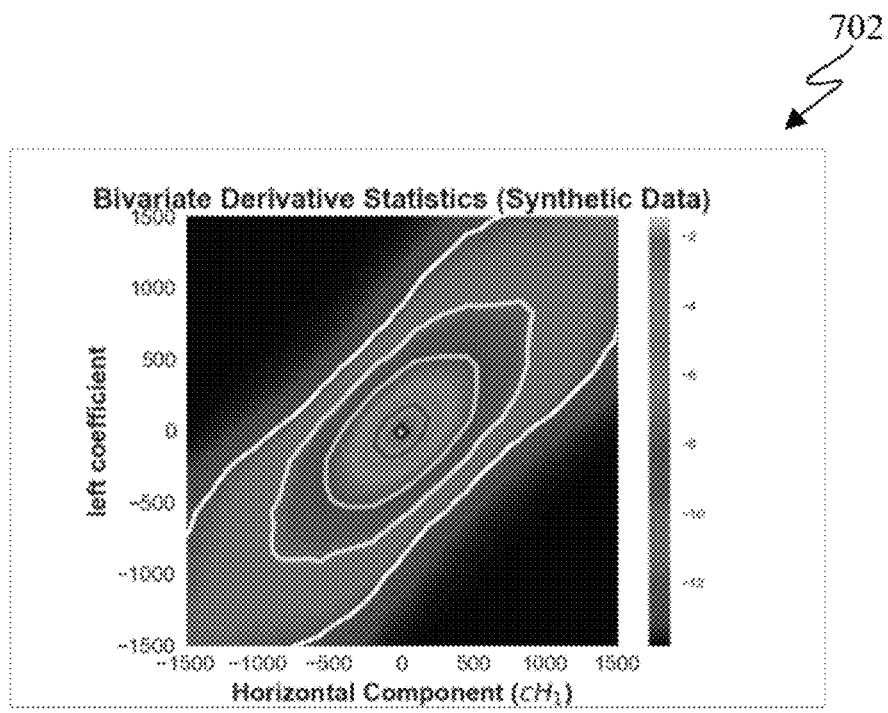

FIGS. 7A and 7B illustrate bivariate derivative statistics in accordance with this disclosure. More particularly, FIG. 7A illustrates real data bivariate derivative statistics 700 and FIG. 7B illustrates synthetic data bivariate derivate statistics 702. The embodiments of the real data bivariate derivative statistics 700 and the synthetic data bivariate derivate statistics 702 shown in FIGS. 7A and 7B are for illustration only. Other embodiments could be used without departing from the scope of the present disclosure.

As shown in FIGS. 7A and 7B, the bivariate derivative statistics show a graph between a left coefficient and a horizontal component for real data in the real data bivariate derivative statistics 700 and synthetic data in the synthetic data bivariate derivate statistics 702. The bivariate derivative statistics shows that the synthetic data is similar to the real data.

Although FIGS. 7A and 7B illustrate bivariate derivative statistics, various changes may be made to FIGS. 7A and 7B. For example, the sizes, shapes, and dimensions of the real data bivariate derivative statistics 700 and the synthetic data bivariate derivate statistics 702 and their individual components can vary as needed or desired. Also, the number and placement of various components of the real data bivariate derivative statistics 700 and the synthetic data bivariate derivate statistics 702 can vary as needed or desired. In addition, the real data bivariate derivative statistics 700 and the synthetic data bivariate derivate statistics 702 may be used in any other suitable imaging process and is not limited to the specific processes described above.

Figure 8:
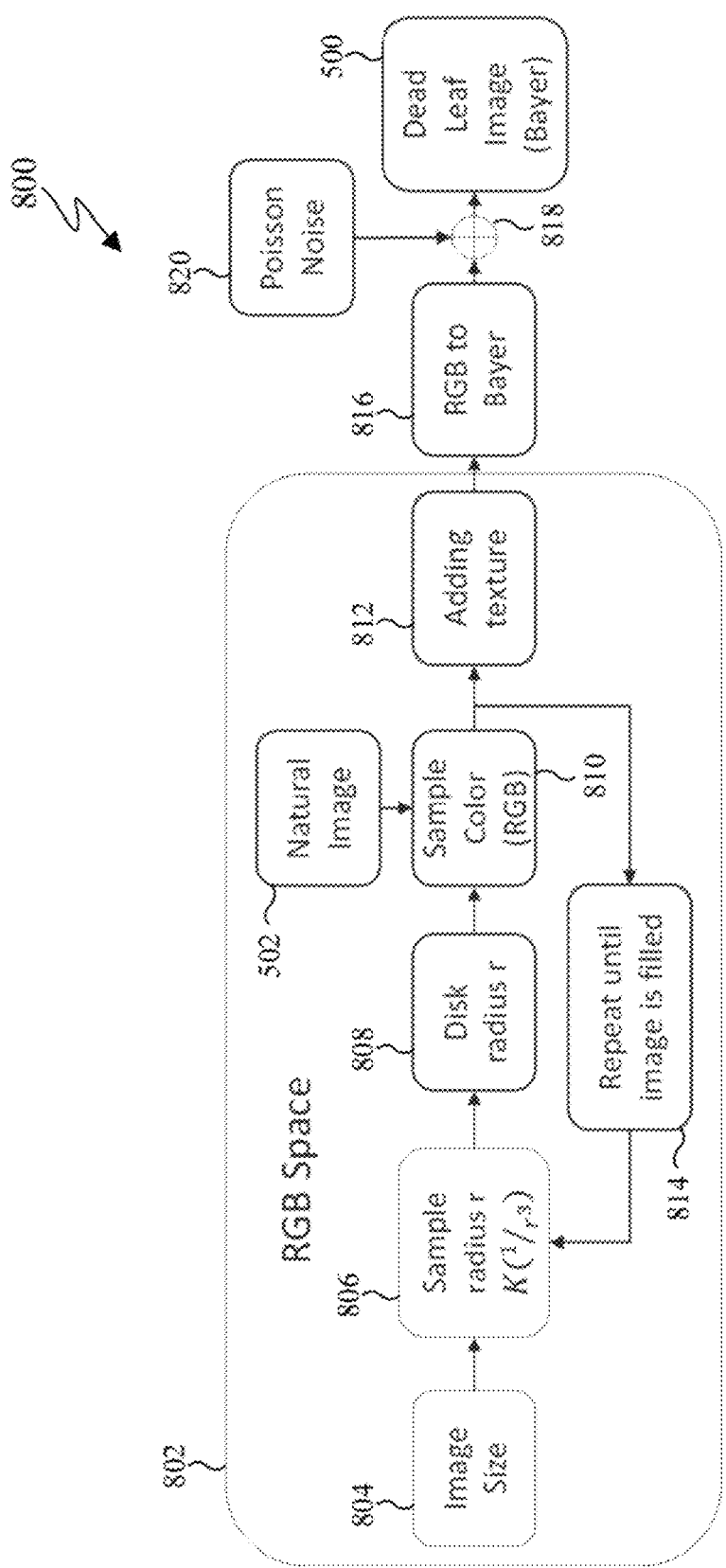
FIG. 8 illustrates a dead leaves generation in accordance with this disclosure.

FIG. 8 illustrates a dead leaves generation 800 in accordance with this disclosure. The embodiment of the dead leaves generation 800 shown in FIG. 8 is for illustration only. Other embodiments could be used without departing from the scope of the present disclosure.

As shown in FIG. 8, the dead leaves generation 800 begins by processing an image in an RGB space 802. The processing in the RGB space 802 includes determining an image size 804, determining a disk radius 806, forming a disk 808, determining an RGB sample color 810 for the disk 808, and adding texture 812.

The image size 804 can be determined based on a pixel height and a pixel width for the image. For example, the image size can be 500×500 pixels. However, any suitable method can be used to determine the image size 804.

The dead leaves objects can be approximated by circular disks 808 of certain radiuses 806. A limit can be applied to the radius 806 to control an amount of details generated. The disk radius 806 can be limited to be within a radius range between a minimum radius and a maximum radius. A sample radius 806 is determined to represent an object in an image. The disk 808 can be formed using the radius. The disk 808 can be randomly placed within the image frame. The disk 808 can be located to overlap one or more other disks or one or more gaps between disks.

The RGB sample color 810 can be chosen as a random color. In certain embodiments, a RGB sample color can correspond to a color in the natural image 502. A color distribution of the natural image 502 can be used to similarly match a color distribution for the RGB sample color(s) 810. An example of color sampling is shown in FIGS. 9A through 9D.

The synthetic image can be checked for empty space and repeat generation 814 of additional disks until image is filled. New dead leaves disks are added until the image does not include any gaps. In certain embodiments, the randomized placement of the disks can be limited to positions where at least a portion of a gap is filled.

Once the image is filled, texture 812 can be added. Adding texture provides several advantages, such as improving image gradients, particularly in smooth regions. The added texture can also reduce ambiguity when learning to map between stereo images and a corresponding disparity map. The added texture also has statistics of the resulting synthetic image that more closely resemble natural images than a non-textured dead leaves model.

The natural image 502 includes a texture 812 that is not shown in the circle discs placed on the synthetic image at this point. The texture 812 can be added by any conventional method for adding texture. The system can include a surface texture library for adding different surface textures to objects in the synthetic image.

Textures can be chosen randomly from a texture database and blended separately for each dead leaves object in the synthetic image. For example, the Brodatz texture database consisting of 122 different patterns can be used with the dead leaves objects. An alpha blending procedure can be implemented for combining the color and texture in the dead leaves objects. The alpha blending can be a constant value or variable value for each of the dead leaves objects in the synthetic image. For example, an equal weighting (=0:5) for the alpha blending can be applied to the texture and the background color. The addition of texture does not change the properties of the synthetic images.

In order to add noise to the synthetic image, the synthetic image is transformed from an RGB domain to a Bayer image 816 in a Bayer domain. An additive function 818 can insert Poisson Noise 820 to the Bayer image 816. The Poisson noise 820 is a basic form of uncertainty associated with a measurement of light. This uncertainty provides the noise that is used to train the AI network. The Poisson noise 820 can represent complementary metal-oxide-semiconductor (CMOS) image sensor noise.

Although FIG. 8 illustrate a dead leaves generation 800, various changes may be made to FIG. 8. For example, the dead leaves generation 800 and its individual components can vary as needed or desired. Also, the number and placement of various components of the dead leaves generation 800 can vary as needed or desired. In addition, the dead leaves generation 800 may be used in any other suitable imaging process and is not limited to the specific processes described above.

FIGS. 9A through 9D illustrate an exemplary color sampling in accordance with this disclosure. More particularly, FIG. 9A illustrates a first natural image 900, FIG. 9B illustrates a second natural image 902, FIG. 9C illustrates a first dead leaves image 904, and FIG. 9D illustrates a second dead leaves image 906. The embodiments of the first natural image 900, the second natural image 902, the first dead leaves image 904, and the second dead leaves image 906 illustrated in FIGS. 9A through 9D are for illustration only. Other embodiments could be used without departing from the scope of the present disclosure.

As shown in FIGS. 9A and 9B, natural images 900, 902 can be used for a specific color description. The first natural image 900 is a view of a small town in a countryside. A color description for the first natural image 900 could include landscape colors, such as greens, browns, and yellows and structure colors, including black, tan, etc. The second natural image 902 is an image of a coffee press on a table with a bench against a wall in the background. A color description for the second natural image 902 could include silver for the coffee press, reds and yellows for the bench and an off white for the wall.

As shown in FIGS. 9C and 9D, the color descriptions from the natural images 900, 902 can be applied for the coloring of the dead leaves' objects in the respective dead leaves' images 904, 906. For example, the first dead leaves image 904 can have dead leaves objects colored using the color description for the first natural image 900. The dead leaves objects for the first dead leaves image 904 could be colored green, brown, yellow, black, tan, etc. The second dead leaves image 906 can have dead leaves objects color using the color description for the second natural image 902. The dead leaves objects for the second dead leaves image 906 could be colored silver, red, yellow, off white, etc.

Although FIGS. 9A through 9D illustrate a color sampling, various changes may be made to FIGS. 9A through 9D. For example, the sizes, shapes, and dimensions of the first natural image 900, the second natural image 902, the first dead leaves image 904, and the second dead leaves image 906 and their individual components can vary as needed or desired. Also, the number and placement of various components of the first natural image 900, the second natural image 902, the first dead leaves image 904, and the second dead leaves image 906 can vary as needed or desired. In addition, the first natural image 900, the second natural image 902, the first dead leaves image 904, and the second dead leaves image 906 may be used in any other suitable imaging process and is not limited to the specific processes described above.

Figure 10:
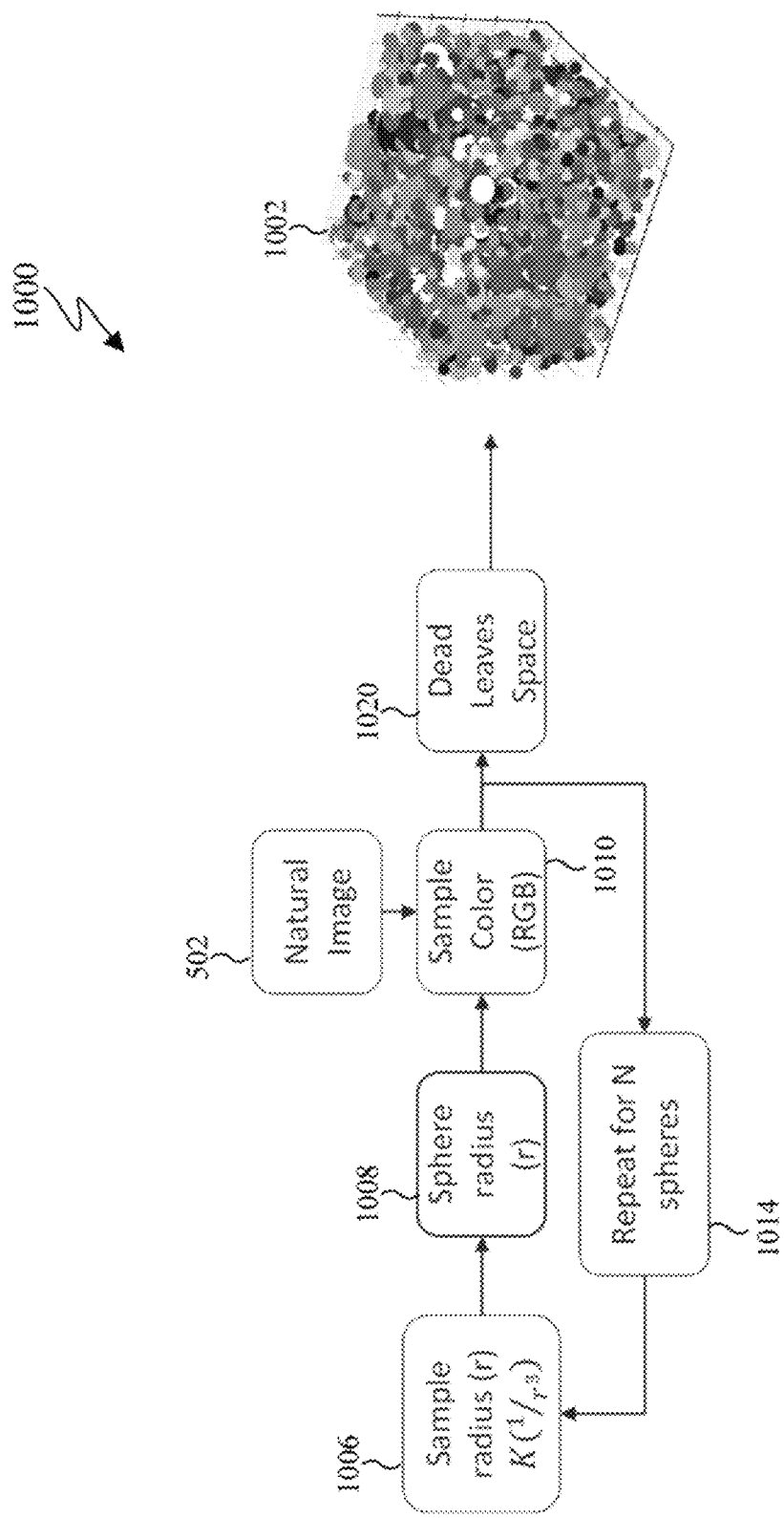
FIG. 10 illustrates a three-dimensional dead leaves space generation in accordance with this disclosure.

FIG. 10 illustrates a three-dimensional (3D) dead leaves space generation 1000 in accordance with this disclosure. The embodiment of the 3D dead leaves space generation 1000 shown in FIG. 10 is for illustration only. Other embodiments could be used without departing from the scope of the present disclosure.

As shown in FIG. 10, a sample radius (r) 1006 can be determined to represent a point cloud in a 3D image. A sphere 1008 is generated using the radius 1006. The sphere 1008 can have a color 1010 added based on a color description from a natural image 502.

Depth is an additional consideration for a 3D model over a 2D model to generate a dead leaves space 1020. The depth needs to be estimated for placing dead leaves objects in a 3D space. A conventional depth estimation can be used to determine depths for each respective dead leaves object in the dead leaves space 1002. Using a stereo camera setup, a depth can be estimated from a viewpoint difference. However, depths cannot be estimated solely based on a synthetic ground truth model.

Although FIG. 10 illustrate a 3D dead leaves space generation, various changes may be made to FIG. 10. For example, the sizes, shapes, and dimensions of the 3D dead leaves space generation 1000 and its individual components can vary as needed or desired. Also, the number and placement of various components of the 3D dead leaves space generation 1000 can vary as needed or desired. In addition, the 3D dead leaves space generation 1000 may be used in any other suitable imaging process and is not limited to the specific processes described above.

Figure 11A:
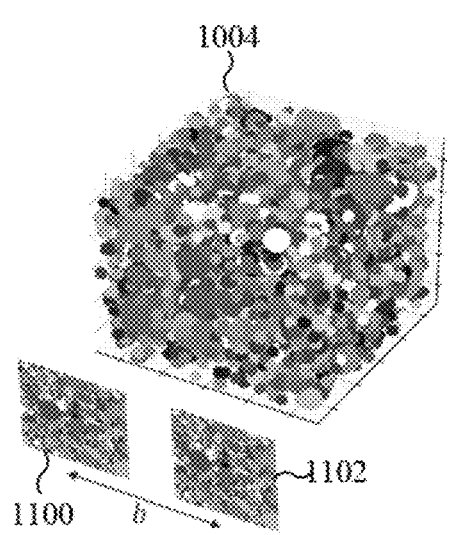
FIGS. 11A through 11D illustrate exemplary dead leaves space with stereo image pair in accordance with this disclosure.
Figure 11D:
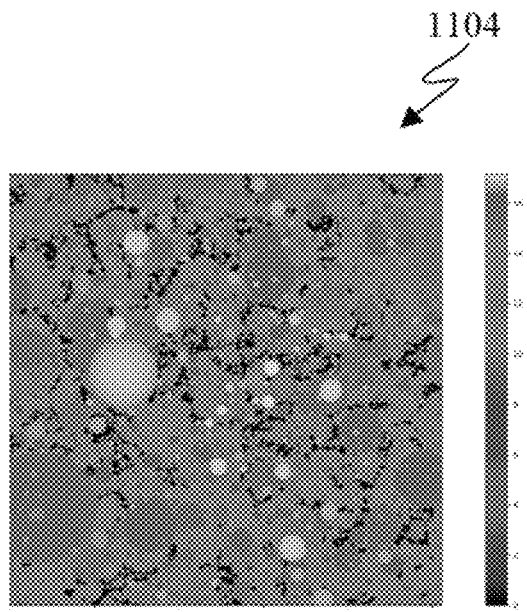
Figure 11B:
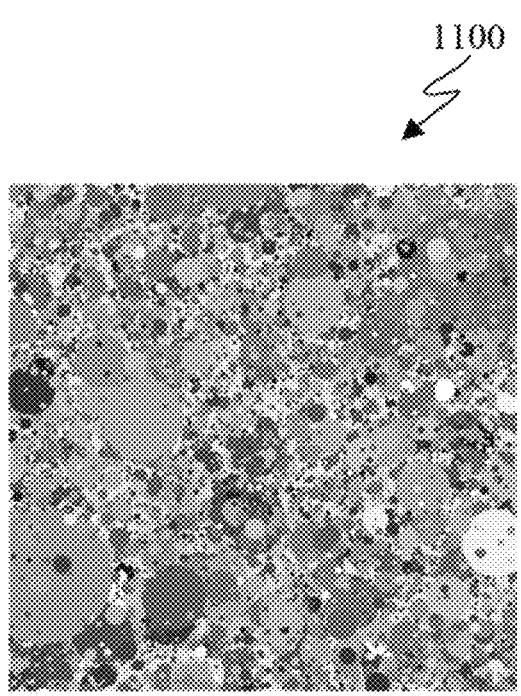
Figure 11C:
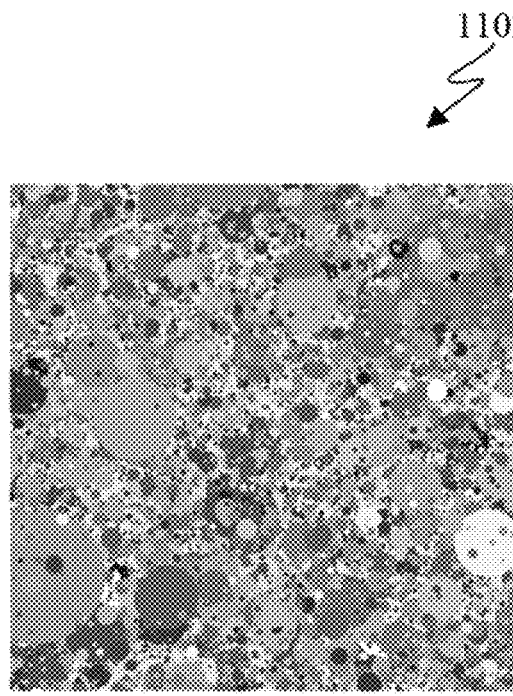

FIGS. 11A through 11D illustrate exemplary dead leaves space with stereo image pair in accordance with this disclosure. More particularly, FIG. 11A illustrates an exemplary dead leaves space, FIG. 11B illustrates a left stereo image 1100, FIG. 11C illustrates a right stereo image 1102, and FIG. 11D illustrates a disparity map 1104. The embodiments of the exemplary dead leaves space, the left stereo image 1100, the right stereo image 1102, and the disparity map 1104 shown in FIGS. 11A through 11D are for illustration only. Other embodiments could be used without departing from the scope of the present disclosure.

As shown in FIGS. 11A through 11D, a 3D dead leaves model for disparity is shown, where a left stereo image 1100 and a right stereo image 1102 are shown. The input parameters for the left stereo image 1100 and the right stereo image 1102 can include a baseline width (b), a focal length (f), a radius parameter (r min), etc. The left stereo image 1100 and the right stereo image 1102 are assumed to have parallel camera planes and horizontal disparity. The parallel camera planes removes a need for rectification. The horizontal disparity can be defined by Equation 1:

$$diparity = \frac{f \times b}{depth} \quad (1)$$

A disparity map 1104 can be generated based on the left stereo image 1100 and the right stereo image 1102. The disparity map 1104 can be used with Equation 1 to determine a depth for each of the dead leaves objects.

Although FIGS. 11A through 11D illustrate an exemplary dead leaves space, various changes may be made to FIGS. 11A through 11D. For example, the sizes, shapes, and dimensions of the exemplary dead leaves space 1002, the left stereo image 1100, the right stereo image 1102, and the disparity map 1104 and their individual components can vary as needed or desired. Also, the number and placement of various components of the exemplary dead leaves space, the left stereo image 1100, the right stereo image 1102, and the disparity map 1104 can vary as needed or desired. In addition, the exemplary dead leaves space, the left stereo image 1100, the right stereo image 1102, and the disparity map 1104 may be used in any other suitable imaging process and is not limited to the specific processes described above.

Figure 12:
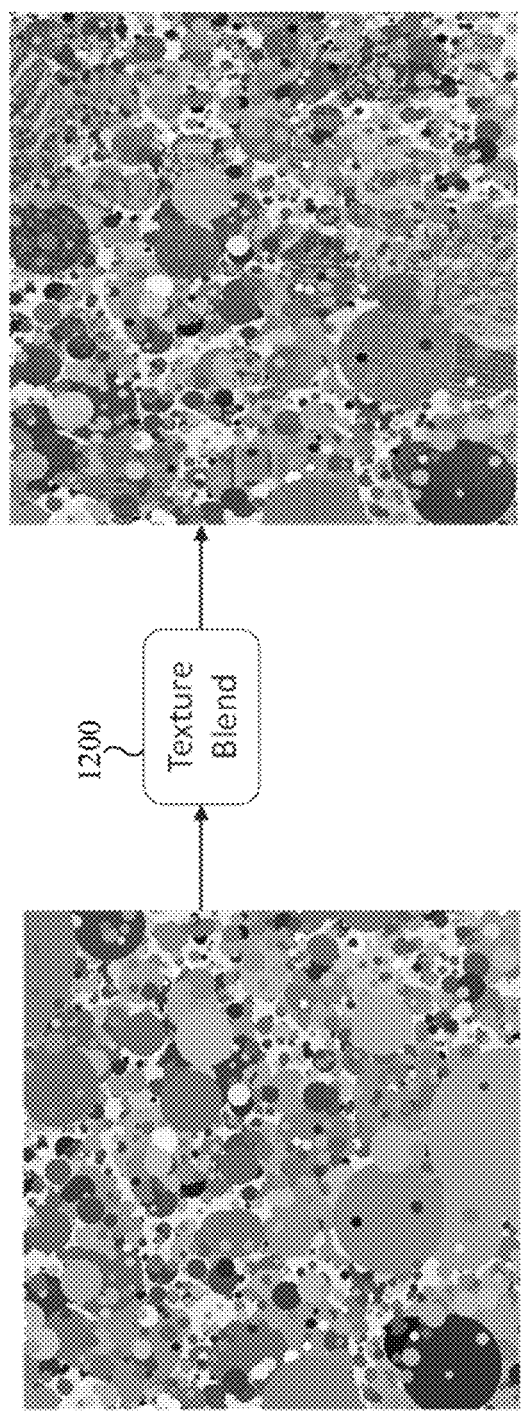
FIG. 12 illustrates a texture blend in accordance with this disclosure.

FIG. 12 illustrates a texture blend 1200 in accordance with this disclosure. The embodiment of the texture blend 1200 shown in FIG. 12 is for illustration only. Other embodiments could be used without departing from the scope of the present disclosure.

As shown in FIG. 12, the texture blend 110 can add texture to the dead leaves' objects in the dead leaves space 1002. The disparity estimation can be improved by adding texture. For example, adding texture or patterns to sphere surfaces can improve image gradients, particularly in smooth regions. The added texture and patterns can also reduce ambiguity between mapping of synthetic stereo images and disparity. The disparity map is unaffected by the addition of texture or patterns.

Although FIG. 12 illustrate a texture blend 1200, various changes may be made to FIG. 12. For example, the sizes, shapes, and dimensions of the texture blend 1200 and its individual components can vary as needed or desired. Also, the number and placement of various components of the texture blend 1200 can vary as needed or desired. In addition, the texture blend 1200 may be used in any other suitable imaging process and is not limited to the specific processes described above.

Figure 13B:
FIGS. 13A through 13C illustrate example images in accordance with this disclosure.
Figure 13A:
Figure 13C:

FIGS. 13A through 13C illustrate example images in accordance with this disclosure. More particularly, FIG. 13A illustrates a noisy image 1300, FIG. 13B illustrates a real data denoised image 1302, and FIG. 13C illustrates a synthetic data denoised image 1304. The embodiments of the noisy image 1300, the real data denoised image 1302, and the synthetic data denoised image 1304 shown in FIGS. 13A through 13C are for illustration only. Other embodiments could be used without departing from the scope of the present disclosure.

As shown in FIGS. 13A through 13C, the noisy image 1300 is a natural image 502 of an empty street at night. Noise can be seen around edges of different objects, such as the bench, in the noisy image 1300 and on solid surfaces, such as the concrete walkway. Both of the real data denoised image 1302 and the synthetic data denoised image 1304 significantly clean up the noise that is present in the noisy image 1300. The edges of the bench appear sharper, and the concert walkway appears less fuzzy. The differences between the real data denoise image 1302 and the synthetic data denoise image 1304 are minimal.

Although FIGS. 13A through 13C illustrate example images, various changes may be made to FIGS. 13A through 13C. For example, the sizes, shapes, and dimensions of the noisy image 1300, the real data denoised image 1302, and the synthetic data denoised image 1304 and their individual components can vary as needed or desired. Also, the number and placement of various components of the noisy image 1300, the real data denoised image 1302, and the synthetic data denoised image 1304 can vary as needed or desired. In addition, the noisy image 1300, the real data denoised image 1302, and the synthetic data denoised image 1304 may be used in any other suitable imaging process and is not limited to the specific processes described above.

Figure 14A:
FIGS. 14A through 14C illustrate example images in accordance with this disclosure.
Figure 14B:
Figure 14C:

FIGS. 14A through 14C illustrate example images in accordance with this disclosure. In particular, FIG. 14A illustrates a noisy image 1400, FIG. 14B illustrates a real data denoised image 1402, and FIG. 14C illustrates a synthetic data denoised image 1404. The embodiments of the noisy image 1400, the real data denoised image 1402, and the synthetic data denoised image 1404 shown in FIGS. 14A through 14C are for illustration only. Other embodiments could be used without departing from the scope of the present disclosure.

As shown in FIGS. 14A through 14C, the noisy image 1400 is a natural image 502 of a sign at night. Noise can be seen around edges of the sign in the noisy image 1400 and in the sky of the background. Both of the real data denoise image 1402 and the synthetic data denoise image 1404 significantly clean up the noise that is present in the noisy image 1400. The edges of the sign are sharper, and the sky appears less fuzzy. The differences between the real data denoised image 1402 and the synthetic data denoised image 1404 are minimal. Any difference in the synthetic data denoise image 1404 compared to the real data denoise image 1402 is marginalized based on the resource savings from not having an engineer produce the training data.

Although FIGS. 14A through 14C illustrate example images, various changes may be made to FIGS. 14A through 14C. For example, the sizes, shapes, and dimensions of the noisy image 1400, the real data denoised image 1402, and the synthetic data denoised image 1404 and their individual components can vary as needed or desired. Also, the number and placement of various components of the noisy image 1400, the real data denoised image 1402, and the synthetic data denoised image 1404 can vary as needed or desired. In addition, the noisy image 1400, the real data denoised image 1402, and the synthetic data denoised image 1404 may be used in any other suitable imaging process and is not limited to the specific processes described above.

Figure 15:
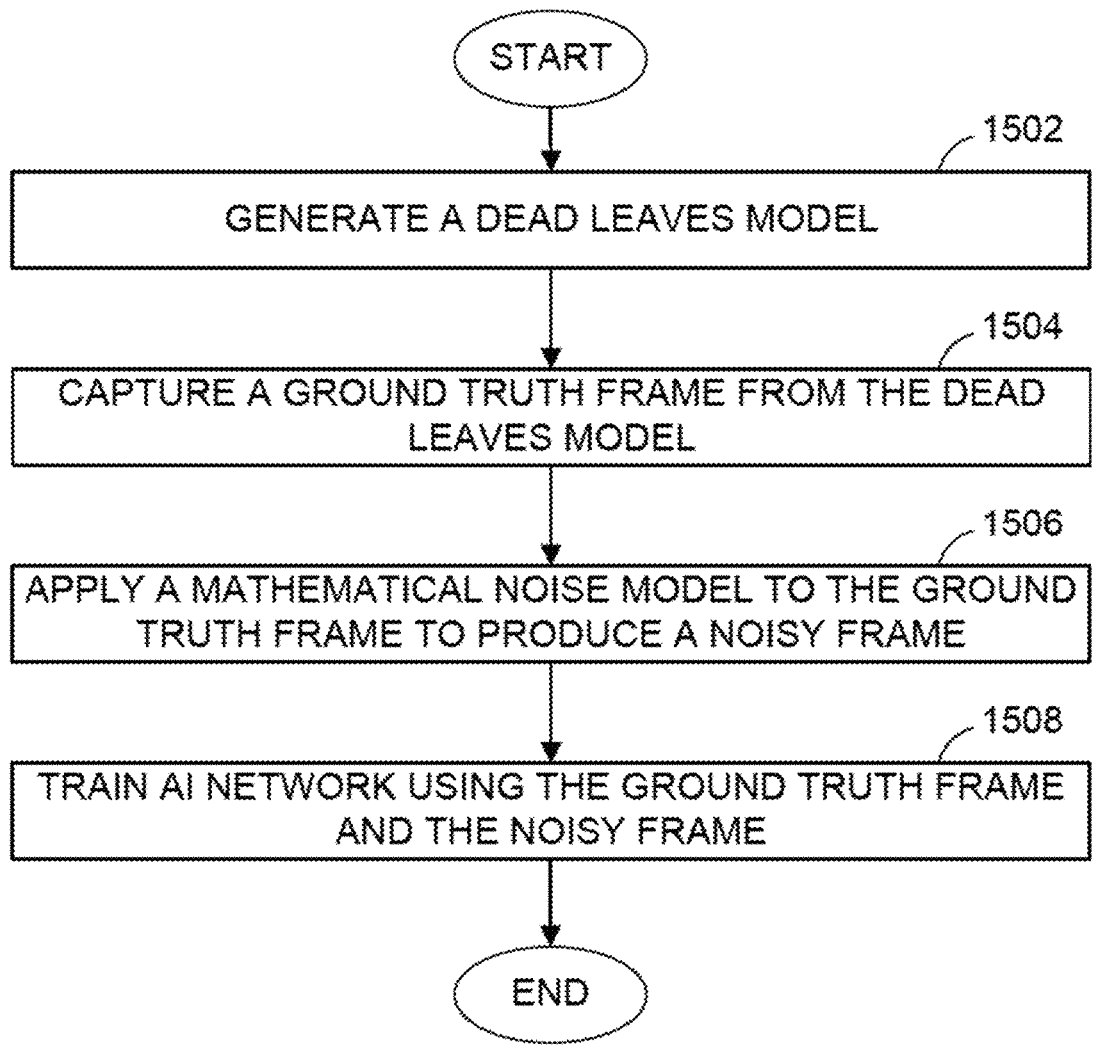
FIG. 15 illustrates an example method for generating a synthetic ground truth image using a dead leaves model according to this disclosure.

FIG. 15 illustrates an example process 1500 for generating a synthetic ground truth image using a dead leaves model according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1500 depicted in the example depicted is implemented by processing circuitry in, for example, an electronic device 101.

As shown in FIG. 15, the electronic device 101 generates a dead leaves model at operation 1502. The dead leaves model can synthetically produce objects for an image frame. A size of the image frame can be determined to be filled with the dead leaves' objects. The dead leaves model can be a 2D model area or a 3D model space. The shapes or objects to be used for the dead leaves' objects can be determined for the dead leaves model. The dead leaves model can also have a specific function for training an AI camera.

The electronic device 101 captures a synthetic ground truth frame from the dead leaves model at operation 1504. The synthetic ground truth frame is the clean frame generated from the dead leaves model.

The dead leaves objects can be any shape including circles, triangles, squares, rectangles, etc. Each dead leaves object has a radius or other dimension(s) determined to define a size of the object. The size of an object can be different for each dead leaves' objects. In certain embodiments, multiple shapes can be used for generating dead leaves objects. Each dead leaves object generate has a color applied to the shape based on a color description of a natural image.

The generation of the dead leaves objects is repeated until an area corresponding to the size of the image frame is filled. In certain embodiments, the placement of the dead leaves object can be restricted to overlapping a non-filled portion or gap of the image frame.

Once the entire frame is filled, texture can be added. The texture can be added individually to each dead leaves object or to all dead leaves' objects in the image frame. The texture can be one or more patterns from a texture database. The texture can be fused with the color in equal parts for the dead leaves object.

The electronic device 101 applies a mathematical noise model to the ground truth frame to produce a noisy frame at step 1506. The mathematical noise model represents noise generated by a specific hardware sensor. Using the mathematical noise model allows for reducing a quantity of captures for a second set of input images. The mathematical noise model can be a Poisson noise model.

The electronic device 101 trains an AI network at step 1508. The AI network can be stored in a memory of the electronic device 101. The ground truth frame is used as a baseline for training the AI network. The noisy frame is used to train the AI network in identifying noise generated by a sensor.

Although FIG. 15 illustrates one example of a process 1500 for generating a synthetic ground truth image using a dead leaves model, various changes may be made to FIG. 15. For example, while shown as a series of steps, various steps in FIG. 15 may overlap, occur in parallel, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. An apparatus comprising:
at least one memory configured to store an artificial intelligence (AI) network; and
at least one processor configured to:
generate a dead leaves model;
capture a ground truth frame from the dead leaves model;
apply a mathematical noise model to the ground truth frame to produce a noisy frame; and
train the AI network using the ground truth frame and the noisy frame;
wherein, to capture the ground truth frame from the dead leaves model, the at least one processor is configured to generate a dead leaves object and apply a texture to the dead leaves object.

2. The apparatus of claim 1, wherein, to capture the ground truth frame from the dead leaves model, the at least one processor is further configured to apply a color to the dead leaves object.

3. The apparatus of claim 2, wherein the at least one processor is configured to select the color from a color description of a natural image.

4. The apparatus of claim 3, wherein:
the at least one processor is configured to generate dead leaves objects until the ground truth frame is filled; and
the at least one processor is configured to color each of the dead leaves objects using one of multiple colors based on the color description of the natural image.

5. The apparatus of claim 1, wherein the mathematical noise model is a Poisson noise to represent a sensor noise.

6. The apparatus of claim 1, wherein:
the at least one processor is configured to generate dead leaves objects until the ground truth frame is filled; and
the at least one processor is configured to apply different textures to different dead leaves objects.

7. The apparatus of claim 2, wherein the at least one processor is configured to fuse a pattern of the texture equally with the color.

8. A method comprising:
generating a dead leaves model;
capturing a ground truth frame from the dead leaves model;
applying a mathematical noise model to the ground truth frame to produce a noisy frame; and
training an artificial intelligence (AI) network using the ground truth frame and the noisy frame;
wherein capturing the ground truth frame from the dead leaves model comprises generating a dead leaves object and applying a texture to the dead leaves object.

9. The method of claim 8, wherein capturing the ground truth frame from the dead leaves model further comprises applying a color to the dead leaves object.

10. The method of claim 9, wherein the color is chosen from a color description of a natural image.

11. The method of claim 10, wherein:
dead leaves objects are generated until the ground truth frame is filled; and
each of the dead leaves objects is colored by one of multiple colors based on the color description of the natural image.

12. The method of claim 8, wherein the mathematical noise model is a Poisson noise to represent a sensor noise.

13. The method of claim 8, wherein:
dead leaves objects are generated until the ground truth frame is filled; and
different textures are applied to different dead leaves objects.

14. The method of claim 9, wherein the texture is a pattern applied to the dead leaves object and is fused equally with the color.

15. A non-transitory computer readable medium containing instructions that when executed cause at least one processor to:
generate a dead leaves model;
capture a ground truth frame from the dead leaves model;
apply a mathematical noise model to the ground truth frame to produce a noisy frame; and
train an artificial intelligence (AI) network using the ground truth frame and the noisy frame;
wherein the instructions that when executed cause the at least one processor to capture the ground truth frame from the dead leaves model comprise instructions that when executed cause the at least one processor to generate a dead leaves object and apply a texture to the dead leaves object.

16. The non-transitory computer readable medium of claim 15, wherein the instructions that when executed cause the at least one processor to capture the ground truth frame from the dead leaves model further comprise instructions that when executed cause the at least one processor to apply a color to the dead leaves object.

17. The non-transitory computer readable medium of claim 16, wherein the instructions when executed cause the at least one processor to select the color from a color description of a natural image.

18. The non-transitory computer readable medium of claim 17, wherein the instructions when executed cause the at least one processor to:
generate dead leaves objects until the ground truth frame is filled; and
color each of the dead leaves objects using one of multiple colors based on the color description of the natural image.

19. The non-transitory computer readable medium of claim 16, wherein the instructions when executed further cause the at least one processor to fuse a pattern of the texture equally with the color.

20. The non-transitory computer readable medium of claim 15, wherein the mathematical noise model is a Poisson noise to represent a sensor noise.

* * * * *